(12) United States Patent
Sumita et al.

(10) Patent No.: US 9,002,698 B2
(45) Date of Patent: Apr. 7, 2015

(54) SPEECH TRANSLATION APPARATUS, METHOD AND PROGRAM

(71) Applicant: Kabushiki Kaisha Toshiba, Minato-ku, Tokyo (JP)

(72) Inventors: Kazuo Sumita, Yokohama (JP); Hirokazu Suzuki, Machida (JP); Kentaro Furihata, Kawasaki (JP); Satoshi Kamatani, Yokohama (JP); Tetsuro Chino, Kawasaki (JP); Hisayoshi Nagae, Yokohama (JP); Michiaki Ariga, Kawasaki (JP); Takashi Masuko, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 192 days.

(21) Appl. No.: 13/859,152

(22) Filed: Apr. 9, 2013

(65) Prior Publication Data
US 2014/0006007 A1    Jan. 2, 2014

(30) Foreign Application Priority Data
Jun. 29, 2012  (JP) .................................. 2012-146880

(51) Int. Cl.
*G06F 17/28* (2006.01)
*G10L 15/26* (2006.01)

(52) U.S. Cl.
CPC .......... *G06F 17/289* (2013.01); *G06F 17/2827* (2013.01); *G06F 17/2836* (2013.01); *G10L 15/26* (2013.01); *Y10S 707/99934* (2013.01)

(58) Field of Classification Search
CPC .............. G06F 17/289; G06F 17/2872; G06F 17/2755; G06F 17/2827; G06F 17/271; G06F 17/2836; G06F 17/2818; G10L 15/22; G10L 15/005; G10L 13/08; G10L 13/043; G10L 15/265

USPC ............. 704/2–5, 9, 231, 251, 257, 277, 252; 709/231, 232; 701/420, 431, 451, 533; 707/760, 769, 999.004, 748, 759, 709, 707/736, 706, 705
See application file for complete search history.

(56) References Cited

U.S. PATENT DOCUMENTS 8,346,537 B2 * 1/2013 Chino et al. ...................... 704/3
8,788,266 B2 * 7/2014 Kitade et al. .................. 704/236
(Continued)

FOREIGN PATENT DOCUMENTS

JP            4042360 B2    2/2008

OTHER PUBLICATIONS

Japanese First Office Action dated Jul. 29, 2014 from JP Application No. 2012-146880, 4 pages.

*Primary Examiner* — Vijay B Chawan
(74) *Attorney, Agent, or Firm* — Ohlandt, Greeley, Ruggiero & Perle, L.L.P.

(57) ABSTRACT

According to one embodiment, a speech translation apparatus includes a speech recognition unit, a translation unit, a search unit and a selection unit. The speech recognition unit successively performs speech recognition to obtain a first language word string. The translation unit translates the first language word string into a second language word string. The search unit search for at least one similar example and acquires the similar example and a translation example. The selection unit selects, in accordance with a user instruction, at least one of the first language word string associated with the similar example and the second language word string associated with the translation example, as a selected word string.

20 Claims, 19 Drawing Sheets

(56) References Cited

U.S. PATENT DOCUMENTS

| | | | |
|---|---|---|---|
| 8,831,945 B2* | 9/2014 | Arai et al. | 704/251 |
| 2003/0154080 A1* | 8/2003 | Godsey et al. | 704/251 |
| 2007/0124131 A1* | 5/2007 | Chino et al. | 704/3 |
| 2009/0222257 A1* | 9/2009 | Sumita et al. | 704/3 |
| 2013/0262076 A1* | 10/2013 | Kamatani et al. | 704/2 |

* cited by examiner

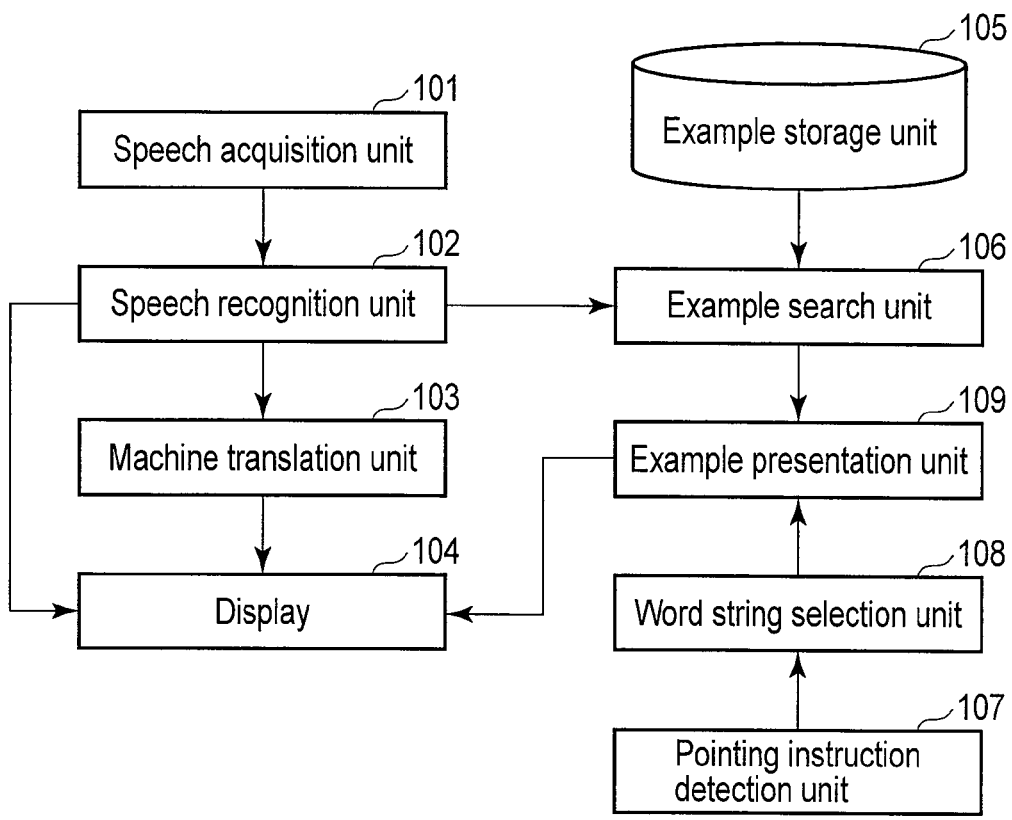

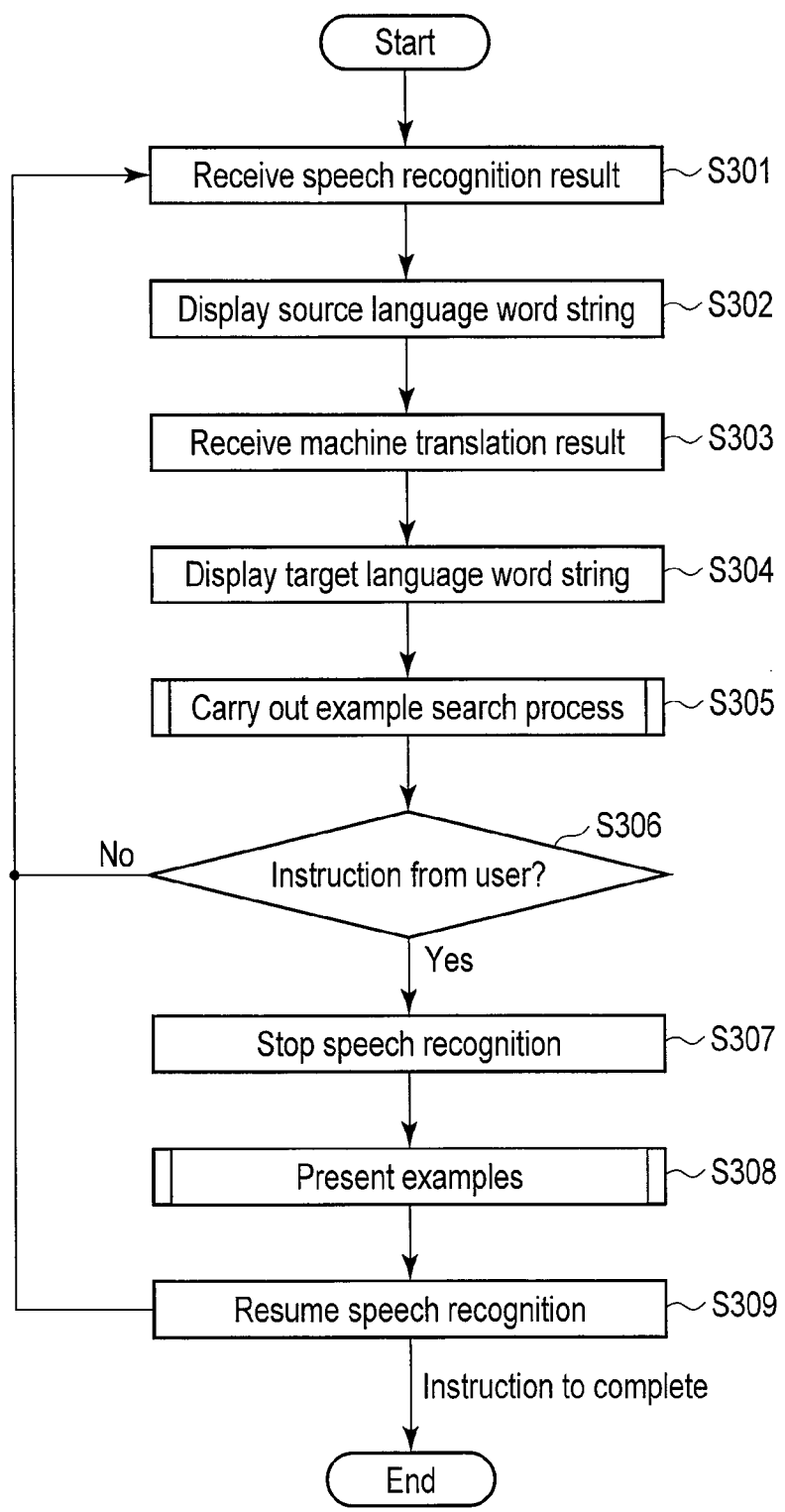
F I G. 3

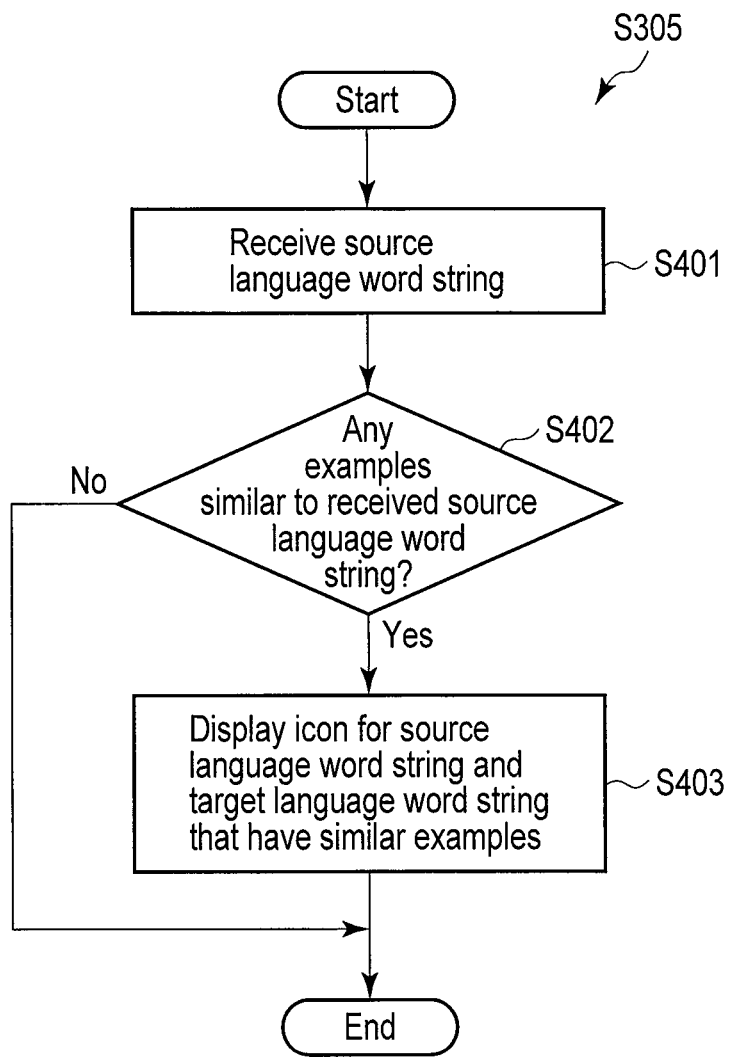
F I G. 4

| 1801 | 1802 | 1803 | 1804 |
|---|---|---|---|
| Source language examples | Annotations | Target language examples | Annotations |
| 結構です | 大丈夫です | That's good. | |
| 結構です | 大丈夫です | All right. | |
| 結構です | 不要です | No thank you. | |
| いらっしゃいませ | | You're welcome. | Welcome to you. |
| とんでもありません | | You're welcome. | Don't mention it. |

F I G. 18

SPEECH TRANSLATION APPARATUS, METHOD AND PROGRAM

CROSS-REFERENCE TO RELATED APPLICATIONS

This application is based upon and claims the benefit of priority from Japanese Patent Application No. 2012-146880, filed Jun. 29, 2012, the entire contents of which are incorporated herein by reference.

FIELD

Embodiments described herein relate generally to a speech translation apparatus, method and program.

BACKGROUND

With the trend of globalization these days, there is an increasing need for a speech translation device that supports communications between users who speak different languages. In fact, some services of providing speech translation functions have been operated. However, it is difficult to provide speech recognition or machine translation without errors. There is a method for prompting a speaker of a target language to point out incomprehensible translation so that a speaker of a source language can correct the translation or modify what they have said for better understanding.

BRIEF DESCRIPTION OF THE DRAWINGS

FIG. 1 is a block diagram of a speech translation apparatus according to the first embodiment.

FIG. 2 is an example table of source language examples and target language examples stored in an example storage.

FIG. 3 is a flowchart of the operation of a speech translation apparatus.

FIG. 4 is a flowchart of the example search process.

FIG. 18 illustrates an example table stored in the example storage according to the second embodiment.

DETAILED DESCRIPTION

Figure 5:
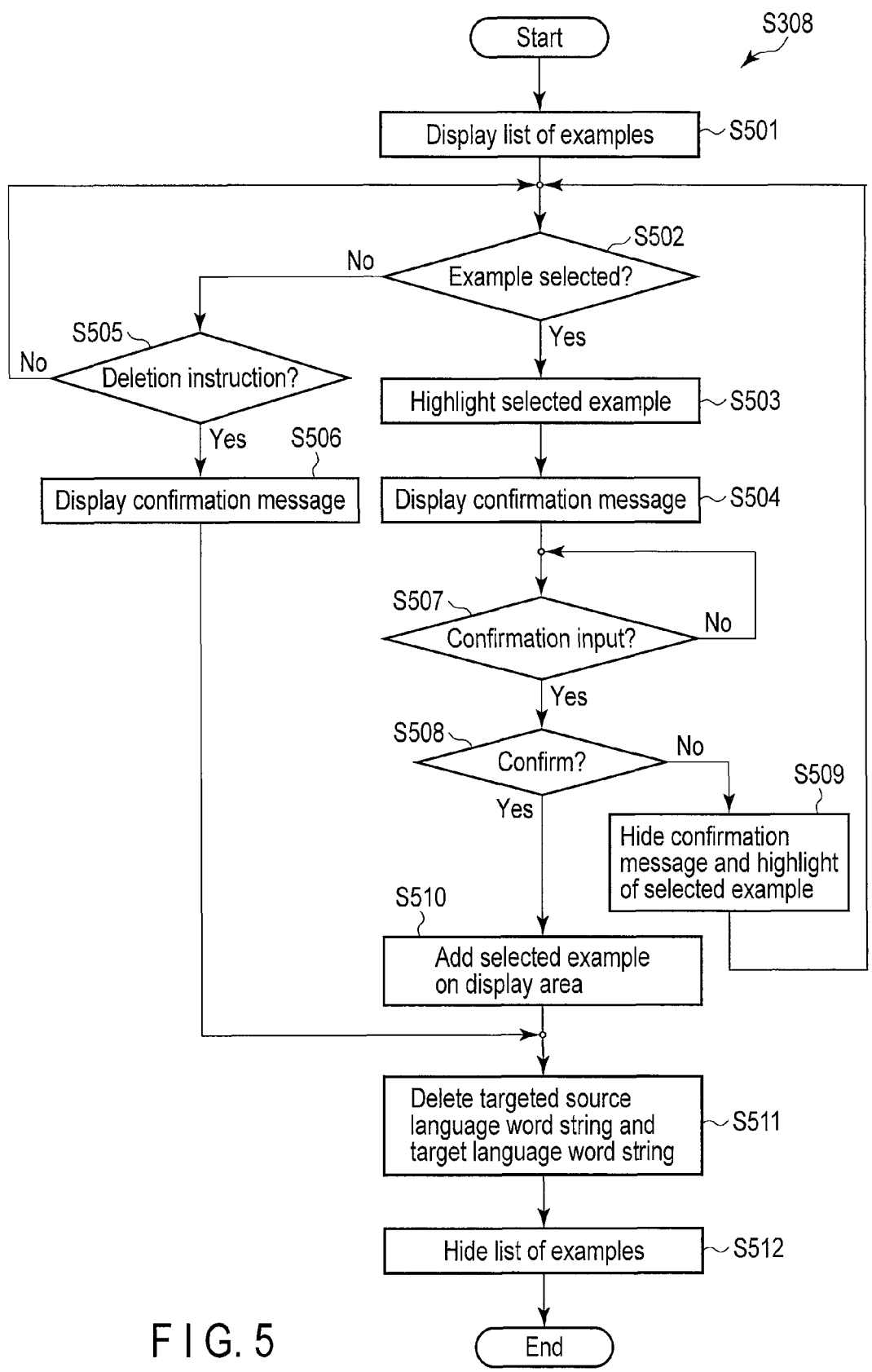
FIG. 5 is a flowchart of the process of presenting similar examples and translation examples.

Recently, speech translation application software that operates on a device such as a smartphone (a multifunction mobile terminal) has been commercialized. Services that provide the functionality of speech translation have also been implemented. With these application software and services, relatively short conversational phrases in language A, for example, one or a few sentences, are converted into a string of words by speech recognition, and the string is translated by a machine translation module to language B, and the translation is output as speech in language B by a speech synthesis module. To use these application software and services, a user who speaks language A is required to speak in short phrases or sentences, at the same time, a user who speaks language B is required to check the translation and listen to the output of speech synthesis, and so on.

Accordingly, conversation between users using conventional speech translation application software often involves waiting, and thus, supporting smooth and responsive conversation has been a challenge to conventional translation application software. It is desirable to remove the restriction that requires users to speak in short units, for example; however, no such a function has been provided.

Generally, a user who speaks language A (a source language) needs to correct incomprehensible parts in a string of words which is a result of speech recognition. Moreover, a user who receives the translation in language B (a target language) needs to provide feedback on the translation, sentence by sentence. Thus, it is difficult to achieve conversation with good responsiveness.

In general, according to one embodiment, a speech translation apparatus includes an acquisition unit, a speech recognition unit, a translation unit, a search unit, a selection unit and a presentation unit. The acquisition unit is configured to acquire speech in a first language as a speech signal. The speech recognition unit is configured to successively perform speech recognition on the speech signal to obtain a first language word string which is a result of the speech recognition. The translation unit is configured to translate the first language word string into a second language to obtain a second language word string which is a result of translation. The search unit is configured to search for at least one similar example for each first language word string, and, if there is the similar example, to acquire the similar example and a translation example which is a result of the translation of the similar example in the second language, the similar example indicating a word string that is similar to the first language word string in the first language. The selection unit is configured to select, in accordance with a user instruction, at least one of the first language word string associated with the similar example and the second language word string associated with the translation example, as a selected word string. The presentation unit is configured to present one or more similar examples and one or more translation examples associated with the selected word string.

In the following, the speech translation apparatus, method and program according to the present embodiment with reference to the drawings. In the following description, repetitive descriptions of the same constituent elements are avoided for brevity. In the description of the present embodiment, the source language is Japanese and the target language is English; however, translation according to the present embodiment can be carried out between any languages.

(First Embodiment)

A speech translation apparatus according to the first embodiment is explained with reference to FIG. 1.

The speech translation apparatus 100 according to the first embodiment includes a speech acquisition unit 101, a speech recognition unit 102, a machine translation unit 103, a display 104, an example storage 105, an example search unit 106, a pointing instruction detection unit 107, a word string selection unit 108, and an example presentation unit 109.

The speech acquisition unit 101 acquires a user's speech in a source language (may be referred to as a first language) as speech signals.

The speech recognition unit 102 receives the speech signals from the speech acquisition unit 101, and performs speech recognition on the speech signals to obtain a source language word string as a result of the speech recognition. The speech recognition unit 102 successively carries out speech recognition unit by unit, during the time when speech signals are input from the speech acquisition unit 101, and every time a source language word string is obtained, it is passed to the next step. A unit for speech recognition process is determined by pauses, linguistic breaks, when a speech recognition candidate is determined, and certain time intervals. A user may be informed by an event that a result of speech recognition can be obtained. As the speech recognition process carried out herein is usual speech recognition, detailed explanation of the speech recognition is omitted.

The machine translation unit 103 receives the source language word string from the speech recognition unit 102, and translates it in a target language (may be referred to as a second language) to obtain a target language word string as a result of the machine translation. As the machine translation process carried out herein is a usual machine translation, detailed explanation of the machine translation is omitted.

The display 104 is, for example, a liquid crystal display (LCD). The display 104 receives the source language word string from the speech recognition unit 102 and the target language word string from the machine translation unit 103, and displays the source language word string and the target language word string. In addition, the display 104 receives a similar example and a translation example from the example presentation unit 109 (described later), and displays those examples. A similar example is an example in a source language similar to a source language word string. A translation example is a translation of a similar example.

The example storage 105 stores examples in a source language and examples in a target language, and the source language examples are associated with the target language examples. The source language examples and the target language examples stored in the example storage 105 will be exampled later with reference to FIG. 2.

The example search unit 106 receives the source language word string from the speech recognition unit 102, and searches for an example similar to the received source language word string from the source language examples accumulated in the example storage 105.

The pointing instruction detection unit 107 acquires point information corresponding to a point indicated by a user on the display 104.

The word string selection unit 108 receives point information from the pointing instruction detection unit 107, and selects a pointed portion in the source language word string or the target language word string as a selected word string.

The example presentation unit 109 receives the selected word string form the word string selection unit 108, receives a similar example and a translation example related to the selected word string from the example search unit 106, respectively. The example presentation unit 109 displays the similar example and the translation example on the display 104. The example presentation unit 109 displays the selected word string, the selected similar example and the translation example with emphasis.

Next, an example of source language examples and target-language examples stored in the example storage 105 is described with reference to FIG. 2.

As shown in FIG. 2, a source language example 201 and a target language example 202 associated with the source language example 201 are stored. For example, a source language word string "あまり歩けない (amari aruke nai)" and a translation "I can't walk such a long distance" are stored in the example storage 105.

The operation of the speech translation apparatus 100 according to the present embodiment is explained with reference to the flowchart in FIG. 3. Although not shown in the flowchart, the speech recognition unit 102 and the machine translation unit 103 are operated in parallel; accordingly, the speech recognition unit 102 and the machine translation unit 103 need to be activated in prior to the process shown in FIG. 3.

In step S301, the speech recognition unit 102 performs speech recognition to obtain a source language word string.

In step S302, the display 104 displays the source language word string.

In step S303, the machine translation unit 103 performs machine translation to obtain a target language word string.

In step S304, the display 104 displays the target language word string. It is possible not to show the source language word string at step S302. Instead, the source language word string may be displayed with the target language word string only after the target language word string is obtained.

In step S305, the examples search unit 106 carries out example search process. The process will be explained later with reference to the flowchart in FIG. 4.

In step S306, the pointing instruction detection unit 107 detects whether there is an instruction from a user, i.e., a pointing to a target language word string whose meaning is unclear, or not. In a case where the display 104 is a touch-screen, the instruction from a user is detected if a user touches a sign that indicates similar examples and translation examples are available. If a user indication is detected, the process proceeds to step S307; if no user indication is detected, the step returns to step S301, and the same process is repeated.

In step S307, the speech recognition unit 102 stops the speech recognition temporarily.

In step S308, the example presentation unit 109 presents examples. The process of presenting examples will be explained later with reference to the flowchart in FIG. 5.

In step S309, the speech recognition unit 102 resumes the speech recognition, and repeats the process from step S301. After this stage, when there is no more input of speech, or when a user instructs to stop the speech recognition, the operation of the speech translation apparatus is stopped.

Next, the details of the operation at step S305 are explained with respect to the flowchart shown in FIG. 4.

In step S401, the example search unit 106 receives the source language word string.

In step S402, the example search unit 106 searches the examples stored in the example storage 105 for an example similar to the obtained source language word string. To search for a similar example, an edit distance between a source language word string and a source language example is calculated, and if an edit distance is not less than a threshold, an example can be determined to be similar to the source language word string. It is also possible to determine an example is similar to the source language word string if the number of morphological matches between the example and the source language word string is not less than a threshold. If there is a similar example, the process proceeds to step S403. If there is no similar example, the process at steps S305 and S306 is completed.

In step S403, the example presentation unit 109 puts an icon on the display 104 to indicate which source language word string has a similar example and which target language word string associated with the source language word string has a translation example.

Next, the process of presenting similar examples and translation examples at step S308 is explained with reference to the flowchart in FIG. 5. Hereinafter, both similar examples and translation examples will be referred to as examples, unless specified.

In step S501, the example presentation unit 109 displays an example with notification. The notification is a message to indicate that a user wants to check meaning. One example or a list of examples can be displayed. In the list, it is possible to display, for example, the top five examples with high similarity to the result of speech recognition, all available examples, or examples selected in accordance with the history of the examples presented in the past.

In step S502, the pointing instruction detection unit 107 detects whether or not an example on the list is pointed out; in other words, the unit detects whether or not a user selected an example. If an example is selected, the process proceeds to step S503; if no example is selected, the process proceeds to step S504.

In step S503, the example presentation unit 109 displays the selected example with emphasis. More specifically, as a result of pointing out a translation example, a color of the selected translation example is reversed or highlighted, for example. When a translation example is displayed with emphasis, the corresponding similar example is also displayed with emphasis, or vice versa.

In step S504, the example presentation unit 109 presents a confirmation message (or a notification). The confirmation message is a message that requests a user to determine whether or not the selected example is appropriate.

In step S505, the pointing instruction detection unit 107 detects whether or not deletion is instructed. An instruction of deletion is detected when a deletion is instructed while a deletion button is selected, for example. If deletion is instructed, the process proceeds to step S506; if no deletion is instructed, the process returns to step S502, and the same process is repeated.

In step S506, the example presentation unit 109 determines that there is no appropriate example in the presented examples, and the display 104 displays a confirmation message that the translation is not understood by your conversation partner.

In step S507, the pointing instruction detection unit 107 detects whether or not there is a pointing by a user as a response to the confirmation message. If there is a confirmation message, the process proceeds to step S508, and if there is no confirmation message, the pointing instruction detection unit 107 waits until there is a pointing from a user.

In step S508, the pointing instruction detection unit 107 detects whether or not the pointing from the user indicates confirm. If the pointing does not indicate confirm, the process proceeds to step S509; if the pointing indicates confirm, the process proceeds to step S510.

In step S509, the example presentation unit 109 hides the confirmation message, and the emphasis put on the selected example. Then the process returns to step S502, and repeats the same process.

In step S510, the example presentation unit 109 adds the selected example to a suitable area on the display, and presents the selected example.

In step S511, the example presentation unit 109 deletes the source language word string and the target language word string which are targets of the process.

In step S512, the example presentation unit 109 hides the list of examples displayed at step S501. Thus, the process of presenting examples is finished.

Next, an example of implementation of the speech translation apparatus is explained with reference to FIG. 6.

Figure 6:
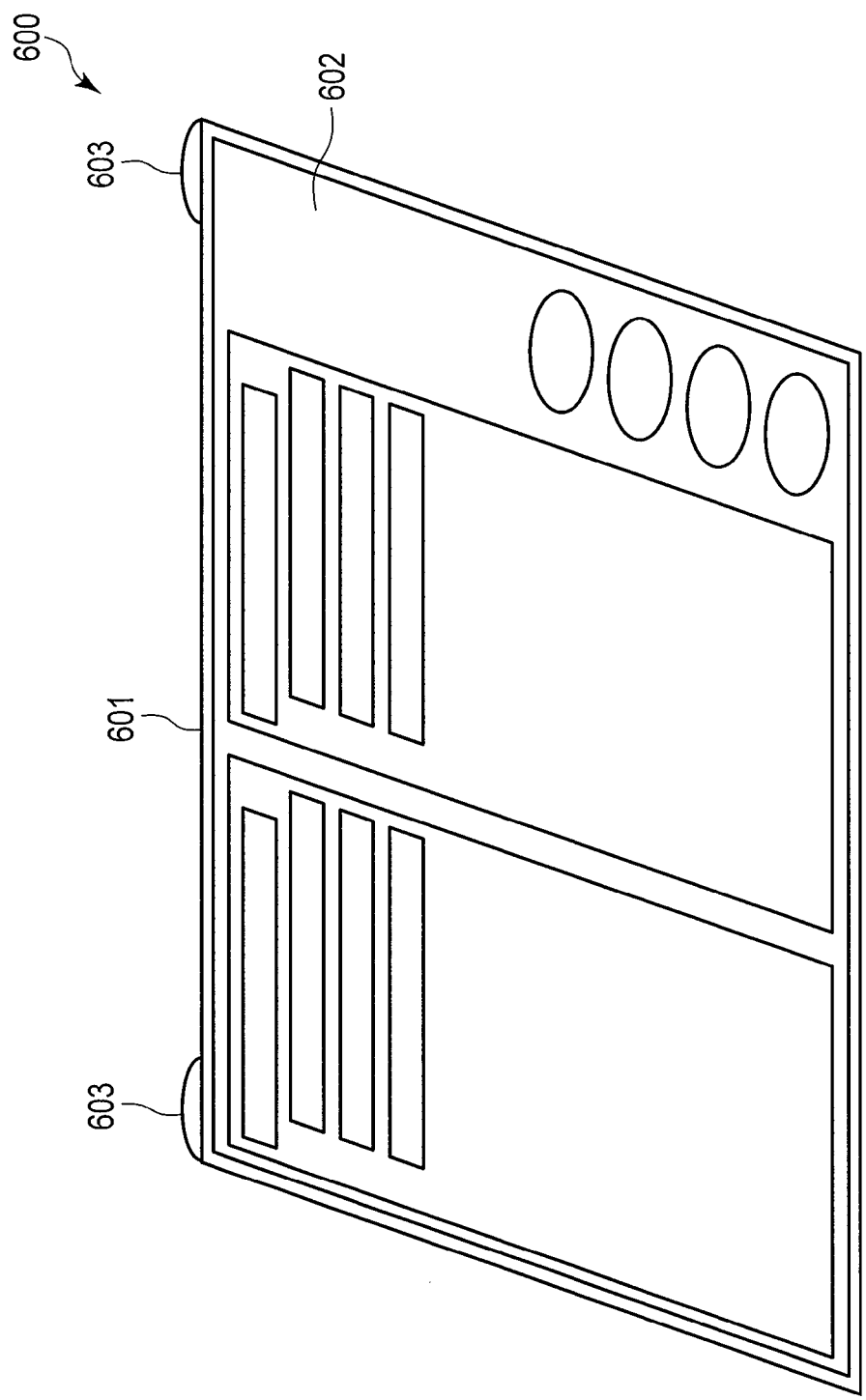
FIG. 6 illustrates an example of implementation of the speech translation apparatus.

FIG. 6 shows an example in which the speech translation apparatus 100 according to the present embodiment is implemented on tablet-type hardware. The speech translation apparatus 600 shown in FIG. 6 includes a body 601, a touchpanel display 602 and a microphone 603.

The touchpanel display 602 and the microphone 603 are implemented on the body 601.

The touchscreen display 602 has a pointing function (a pointing instruction detection unit) for detecting a contact with a user's fingertip on the screen as a pointing if the screen is an electrostatic capacitance touchscreen, and a display function (a display) for displaying texts and images.

As a general microphone can be used for the microphone 603, explanation of the microphone is omitted.

Next, an example of screen display on the touchscreen display 602 is explained with reference to FIG. 7.

Figure 7:
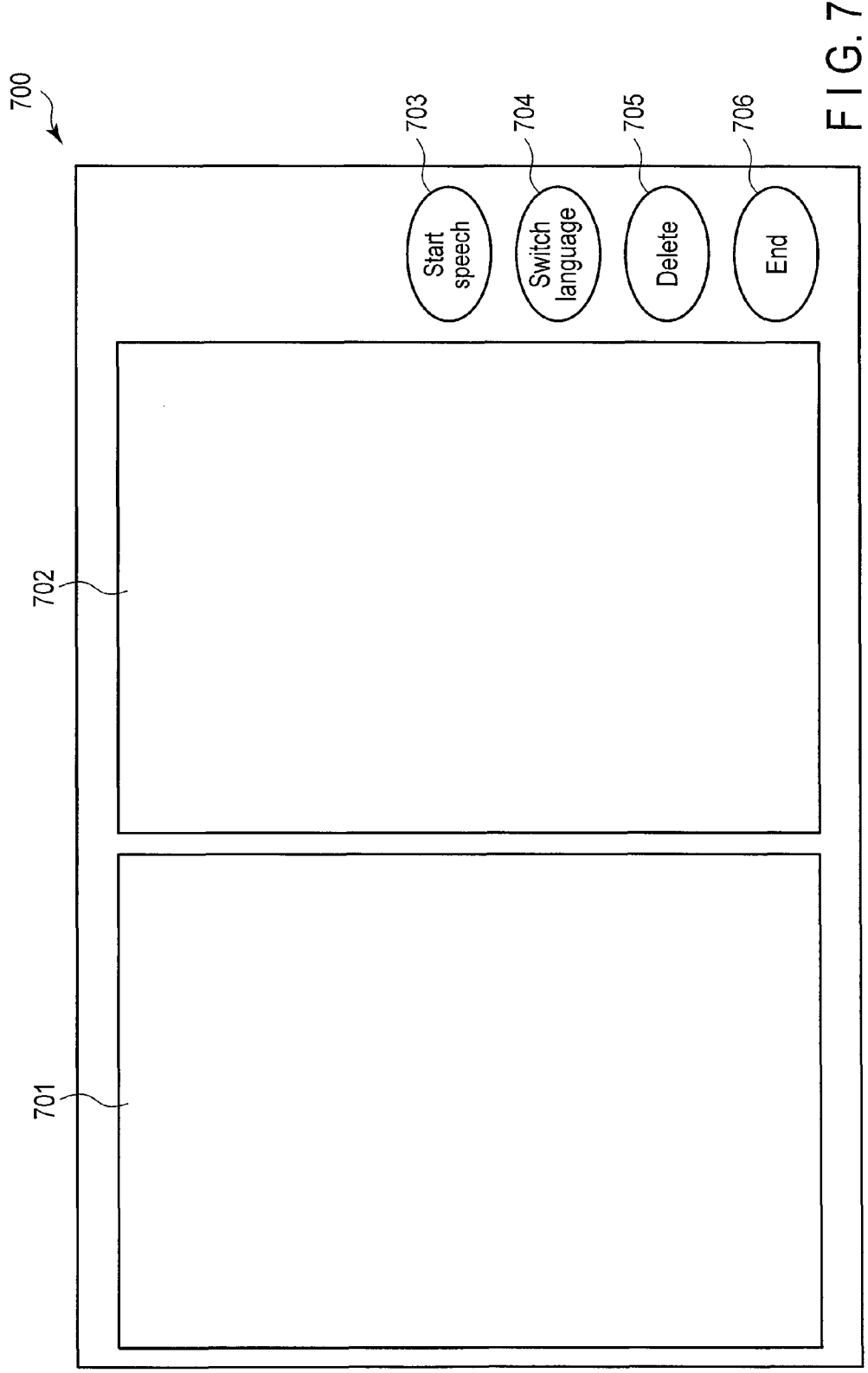
FIG. 7 illustrates an example of screen of a touchscreen.

As shown in FIG. 7, as an example of layout for a screen display, a display area 701 on which source language word strings are shown on the left half of the screen and a display area 702 on which target language word strings on the right half of the screen are displayed. The far right of the screen is a column of a speech start button 703, a language switch button 704, a delete button 705, and an end button 706.

The speech start button 703 is pointed by a user to instruct to start speech. The language switch button 704 is pointed by a user to switch between a source language and a target language. The delete button 705 is pointed when deleting examples, etc. The end button 706 is pointed to end speech recognition.

The layout of the buttons is not limited to the layout shown in FIG. 7. For example, a group of buttons can be popped-up as needed by the user. The display is not limited to a touchscreen display. For example, a combination of a screen and a keyboard can be adopted.

Next, a specific example of the operation of the speech translation apparatus according to the present embodiment is explained with reference to FIGS. 8 to 14. Here, the operation example using the speech translation apparatus 600 shown in FIG. 6 is explained.

Figure 8:
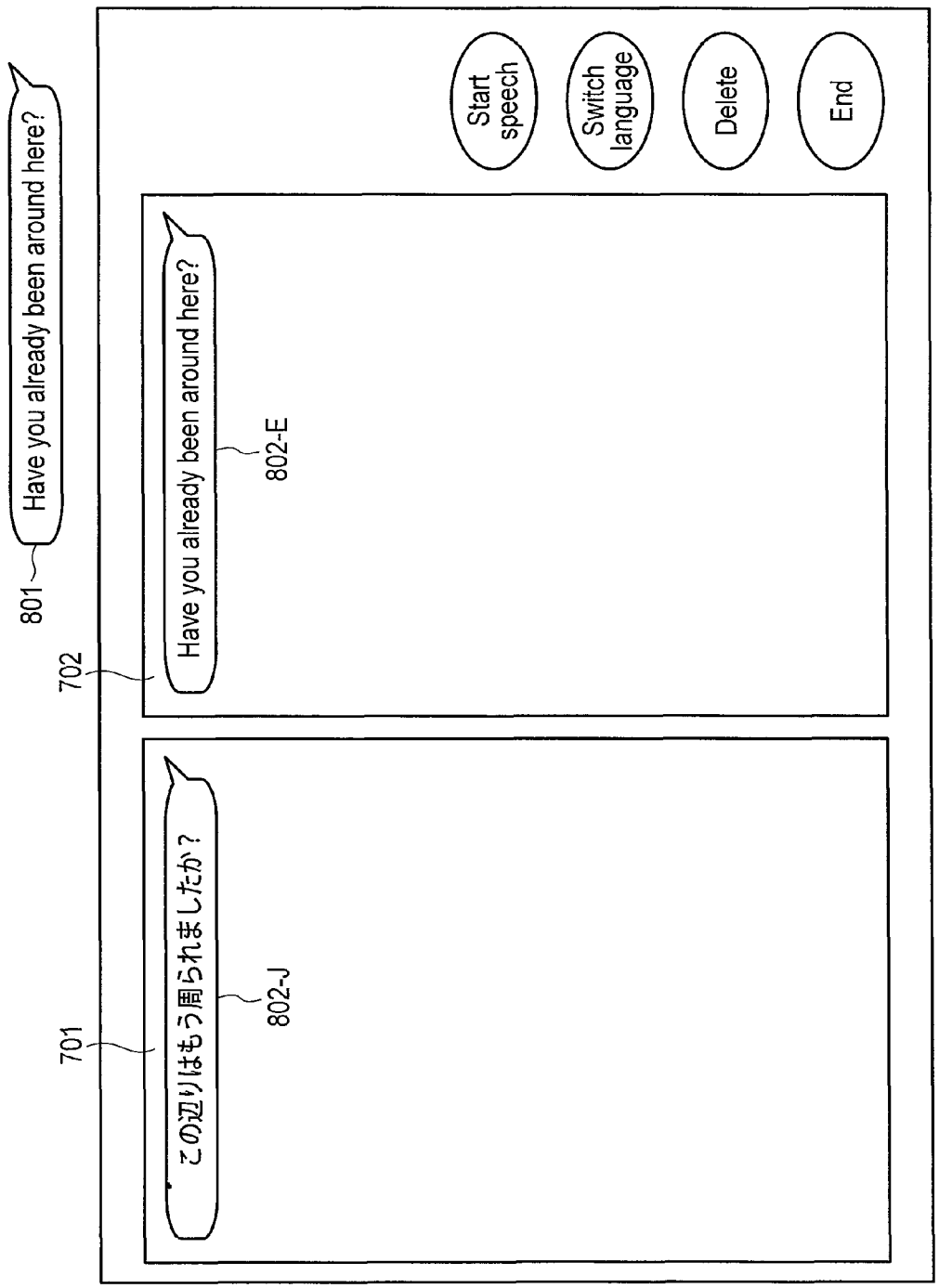
FIG. 8 illustrates the first process of the operation of the speech translation apparatus.

FIG. 8 shows an example of a display when a user speaks in the target language. The example of FIG. 8 shows a machine translation of speech in a target language to a source language. To achieve the machine translation in this example, Japanese as a source language and English as a target language are switched to perform the process same as the above-described process. More specifically, when a user utters a speech sound 801, "Have you already been around here?" a speech recognition result 802-E, "Have you already been around here?" is displayed on the display area 702, and a machine translation result 802-J "この辺りはもう周られましたか (kono atari ha mou mawa rare masita ka?)" which is a Japanese translation of the speech recognition result 802-E is displayed on the display area 701.

Figure 9:
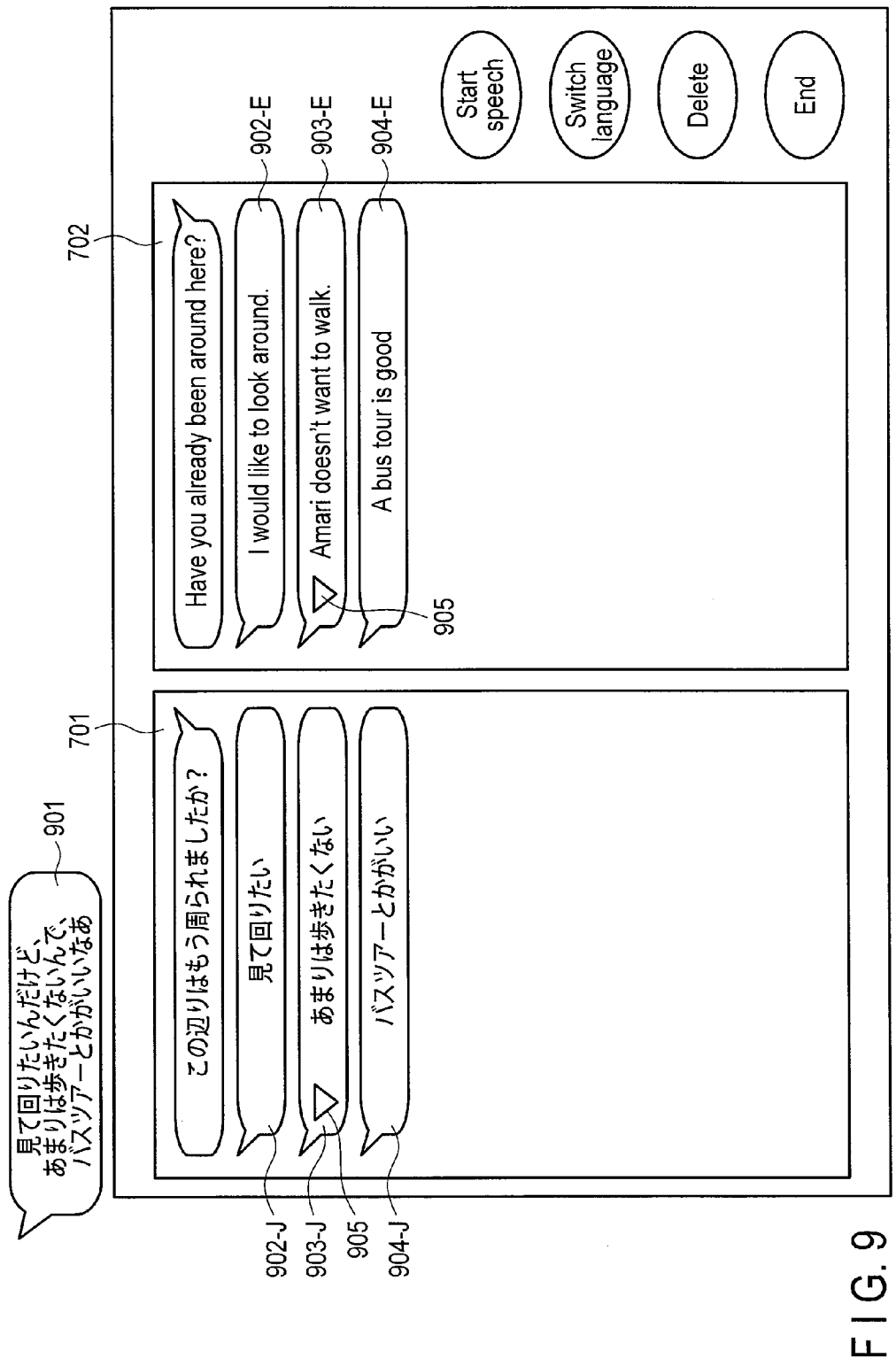
FIG. 9 illustrates the second process of the operation.

FIG. 9 shows an example of a display when a user speaks in the source language. The speech acquisition unit 101 acquires a speech sound 901 "見て回りたいんだけど、

あまりは歩きた くないんで、バス ツアー とかがい いなあ (mite mawari tain da kedo, amari ha aruki taku nainde, basu tuaa toka ga ii naa)," and the display area 701 displays a source language word string 902-J "見て回りたい (mite mawari tai)," 903-J "あまりは歩 きたくない (amari ha aruki taku nai)," 904-J "バスツアー とかがいい (basu tuaa toka ga ii)" subsequently as a result of speech recognition. In addition, the display area 702 displays the machine translation results corresponding to the speech recognition results, i.e., a target language word string 902-E "I would like to look around," 903-E "Amari doesn't want to walk," 904-E "a bus tour is good." An icon 905 indicates that a similar example and a translation example are available. In this example, the target language word string 903-E does not make sense because of the error caused by the machine translation.

Figure 10:
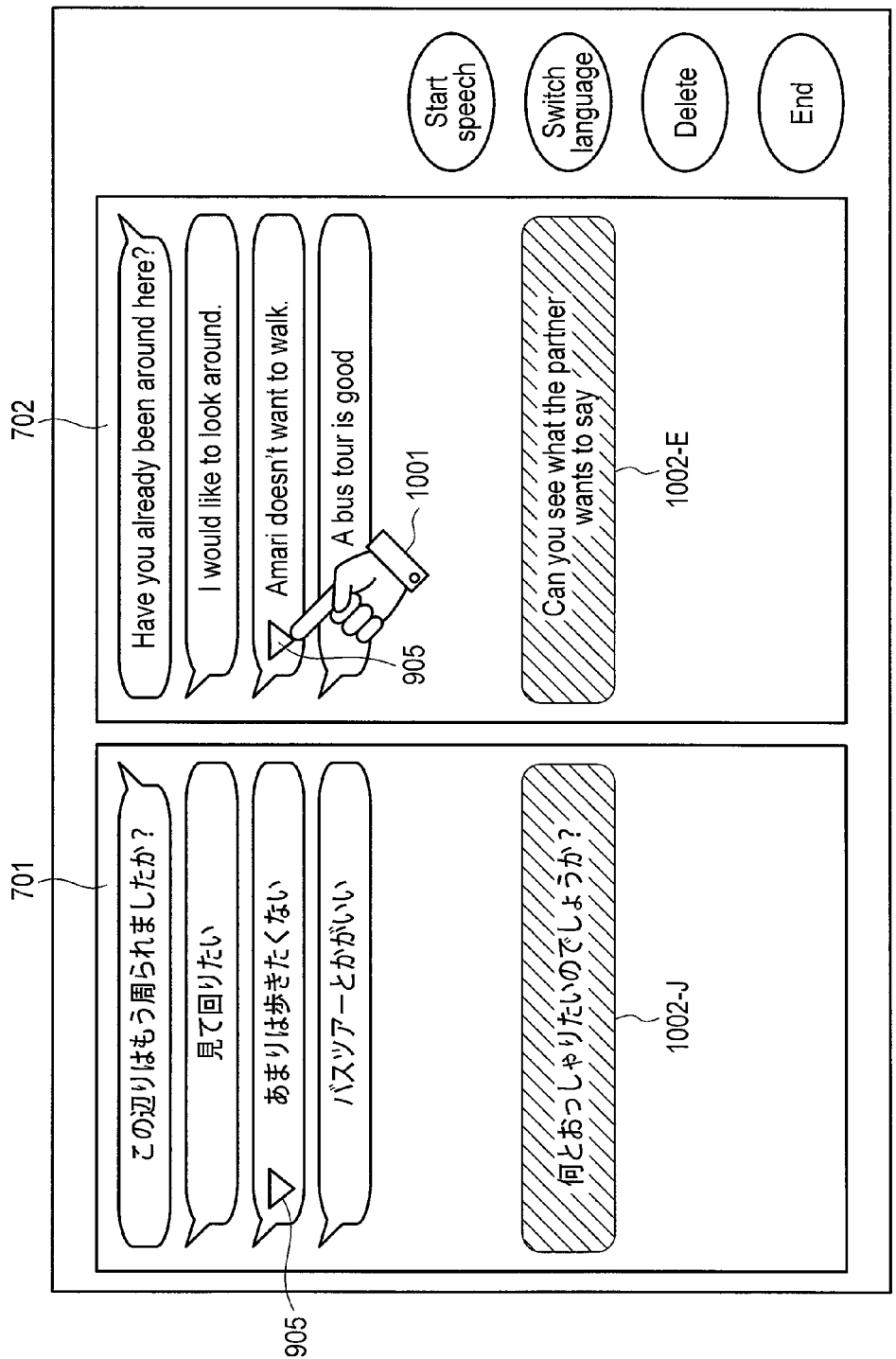
FIG. 10 illustrates the third process of the operation.

FIG. 10 shows an example where the user on the target language side points out the target language word string 903-E that does not make sense. Pointing can be a touch on the icon 905, or a cursor on the icon 905. When the icon 905 is pointed, a message 1002-E and a corresponding message 1002-J are shown on the display. In the example shown in FIG. 10, the message 1002-J "何とおっしゃりた いのでしょうか？ (nan to osshari tai no desyo u ka) (What would you like to say?)" is shown on the display area 701, and the message 1002-E "Can you understand what your partner wants to say" is shown on the display area 702.

Figure 11:
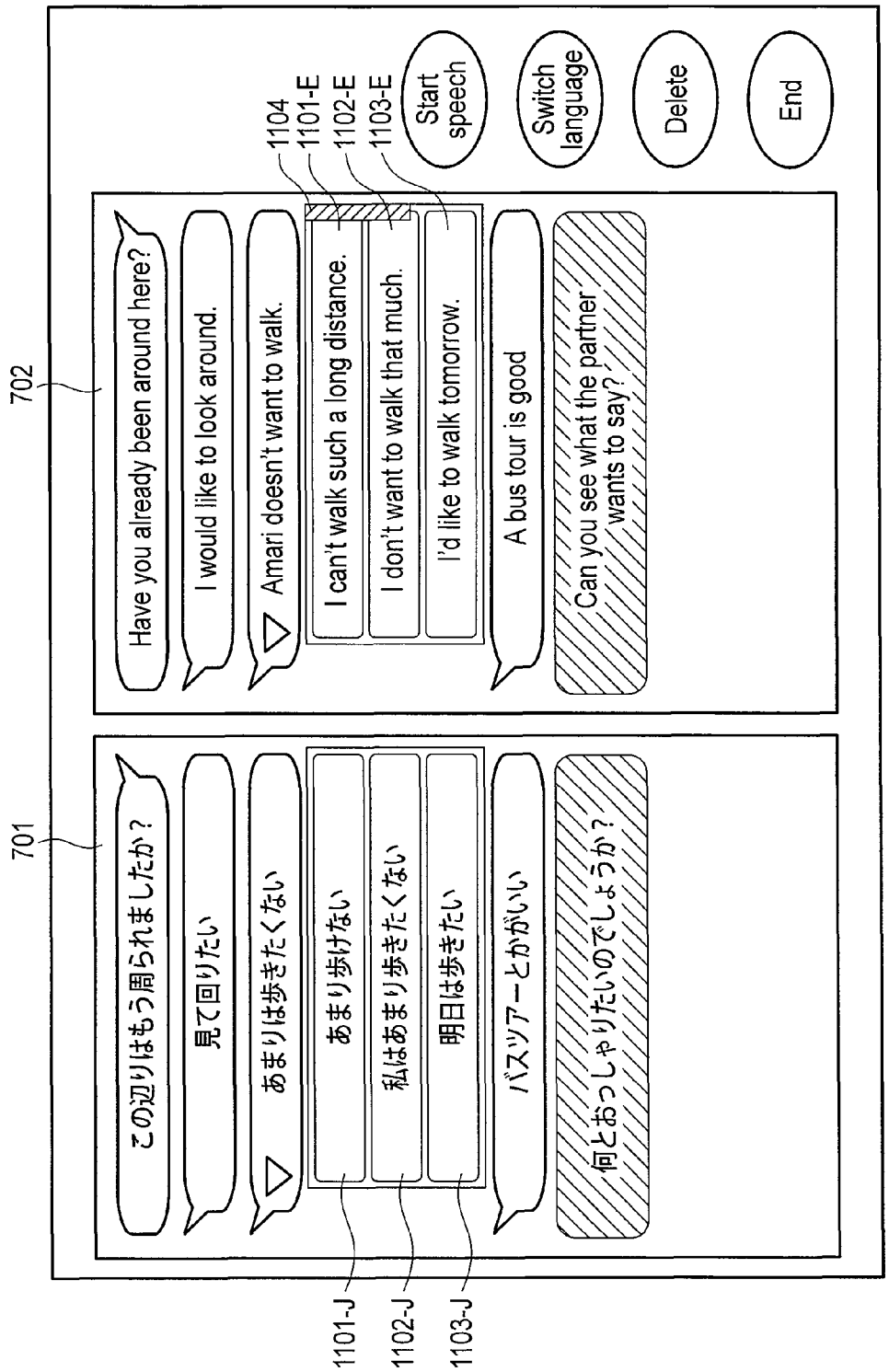
FIG. 11 illustrates the fourth process of the operation.

In FIG. 11, as a result of selecting a target language word string by a user, a similar example of the source language word string is shown on the display area 701, and a corresponding translation example of the target language word string is shown on the display area 702. For example, similar examples 1101-J "あまり歩 けない (amari aruke nai)", 1102-J "私はあまり 歩きたくない (watasi ha amari aruki taku nai)" and 1103-J "明日は歩きた い (asita ha aruki tai)", and a translation example 11101-E (corresponding to 1101-J) "I can't walk such a long distance," 1102-E (corresponding to 1102-J) "I don't want to walk," and 1103-E (corresponding to 1103-J) "I'd like to walk tomorrow" are displayed.

Figure 12:
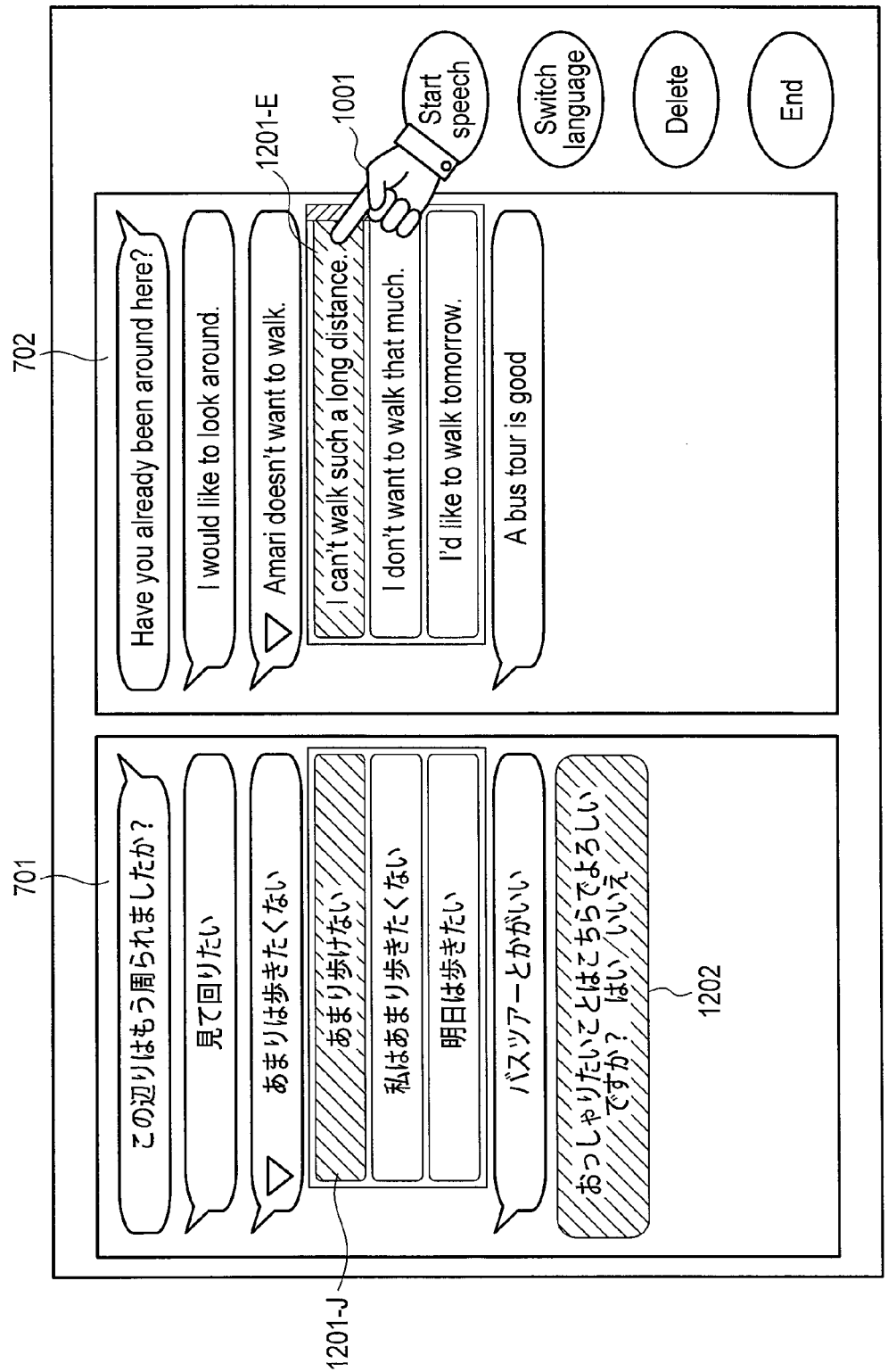
FIG. 12 illustrates the fifth process of the operation.

FIG. 12 shows an example in which the user on the target language side selects a translation example. In this example, the translation example 1201-E "I can't walk for a long distance" is selected, and the selected translation example and its corresponding similar example 1201-J are highlighted. When the translation example is selected, a message 1202 "おっしゃりたい ことはこの 内容でよろし いですか (osshari tai koto ha kono naiyou de yorosii desu ka) (Is this what you would like to say?)" is displayed on the display area 701 on the source language area. If more than one similar examples and translation examples are shown, the list of similar examples and translation examples can be scrolled using a scroll bar 1104.

Figure 13:
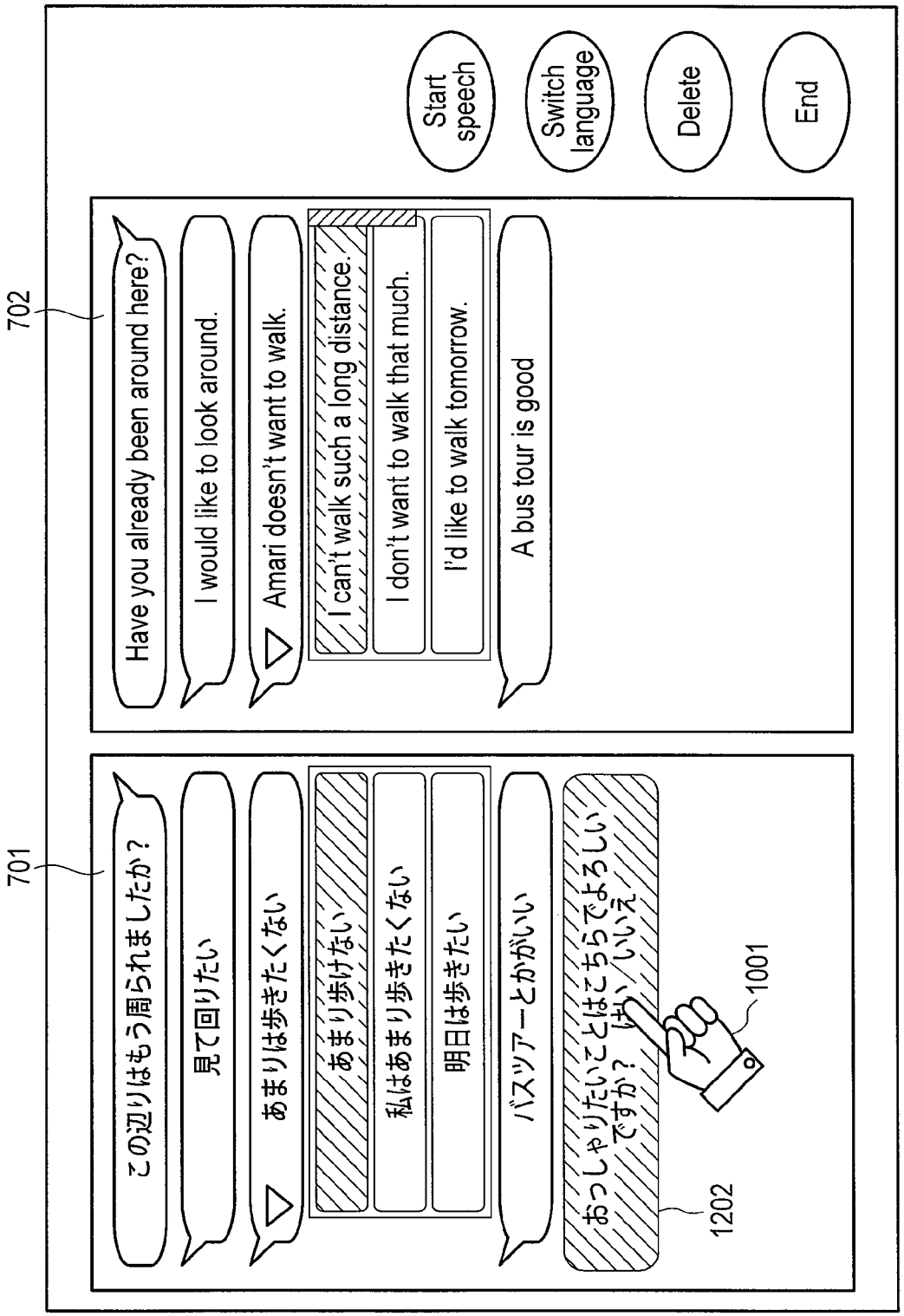
FIG. 13 illustrates the sixth process of the operation.

In FIG. 13, the user on the target language side points at an incomprehensive target language word string to answer whether or not the user accepts the highlighted similar example. More specifically, in the example shown in FIG. 13, the user touches "はい (hai) (YES)" or "いいえ (iie) (NO)" in the message 1202 on the display, or selects by moving the cursor 1001. Then, the pointing instruction detection unit 107 detects which of "YES" or "NO" the user selected.

Figure 14:
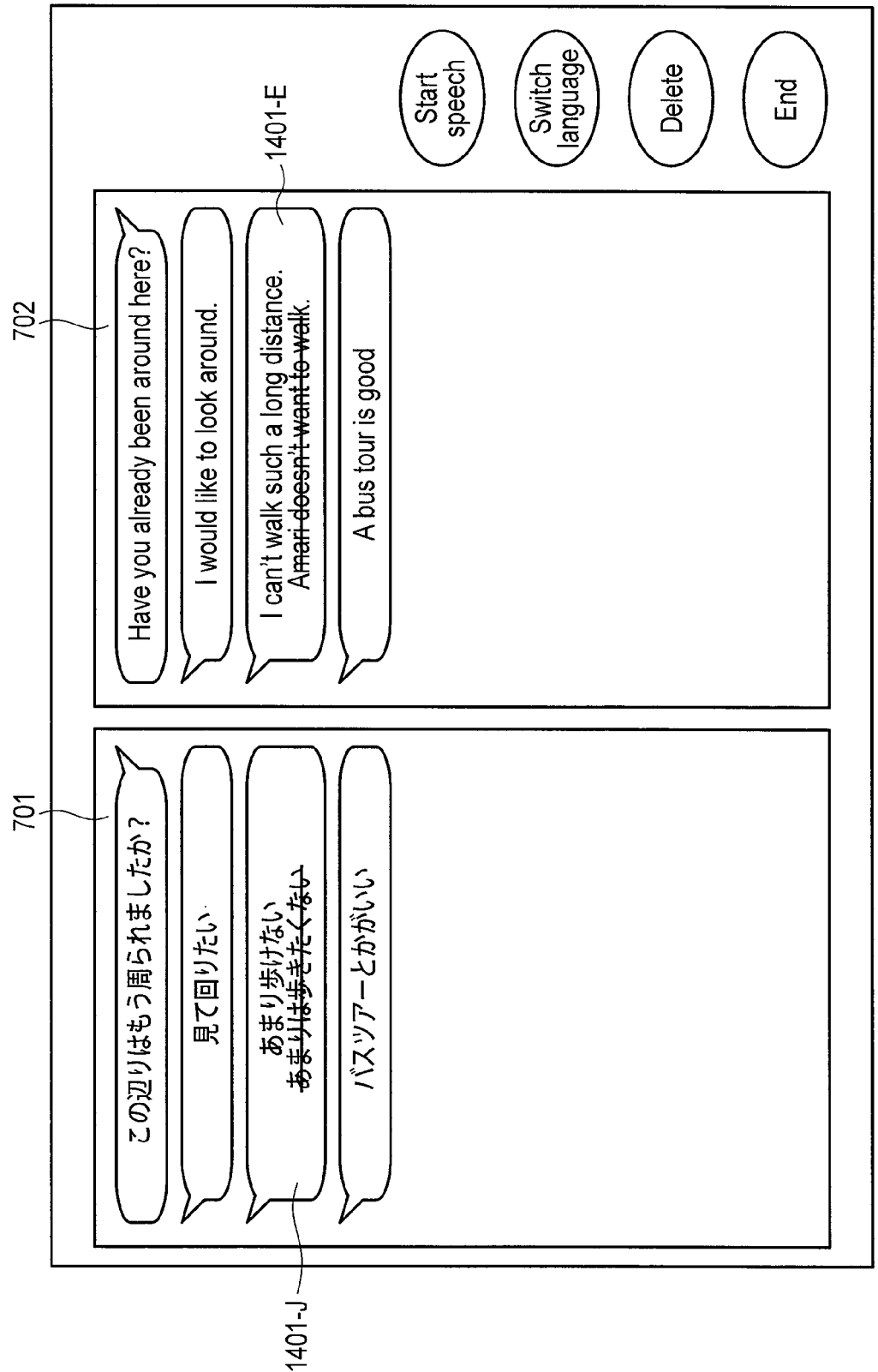
FIG. 14 illustrates the second process of the operation.

In FIG. 14, when the user on the source language side selects "はい (YES)," the list of similar examples and translation examples is hidden, and a selected similar example and its corresponding translation example are added to display on the display areas 701 and 702, and the original source language word string and target language word string which are translation errors are deleted. For example, a strikethrough is put over the source language word string 1401-J "あまり歩 きたくない (amari aruki taku nai)," and a similar example "あまり歩けない (amari aruke nai)" is displayed above it. On the other hand, a strikethrough is put over the target language word string 1401-E "Amari doesn't want to walk," and a translation example "I can't walk such a long distance" is displayed above it. Thus, even when the target language user does not understand the translation result, if the target language user can select an example, a corresponding example is shown to the source language user. What the source language user needs to do is to determine whether or not the selected similar example is appropriate. Therefore, the ability of paraphrasing on the source language user side is not required to carry out smooth conversations between the users.

In the above example, the target language user selects a translation example; however, the source language user may select a similar example. The examples in which the source language user selects a similar example will be explained below with reference to FIGS. 15 and 16.

Figure 15:
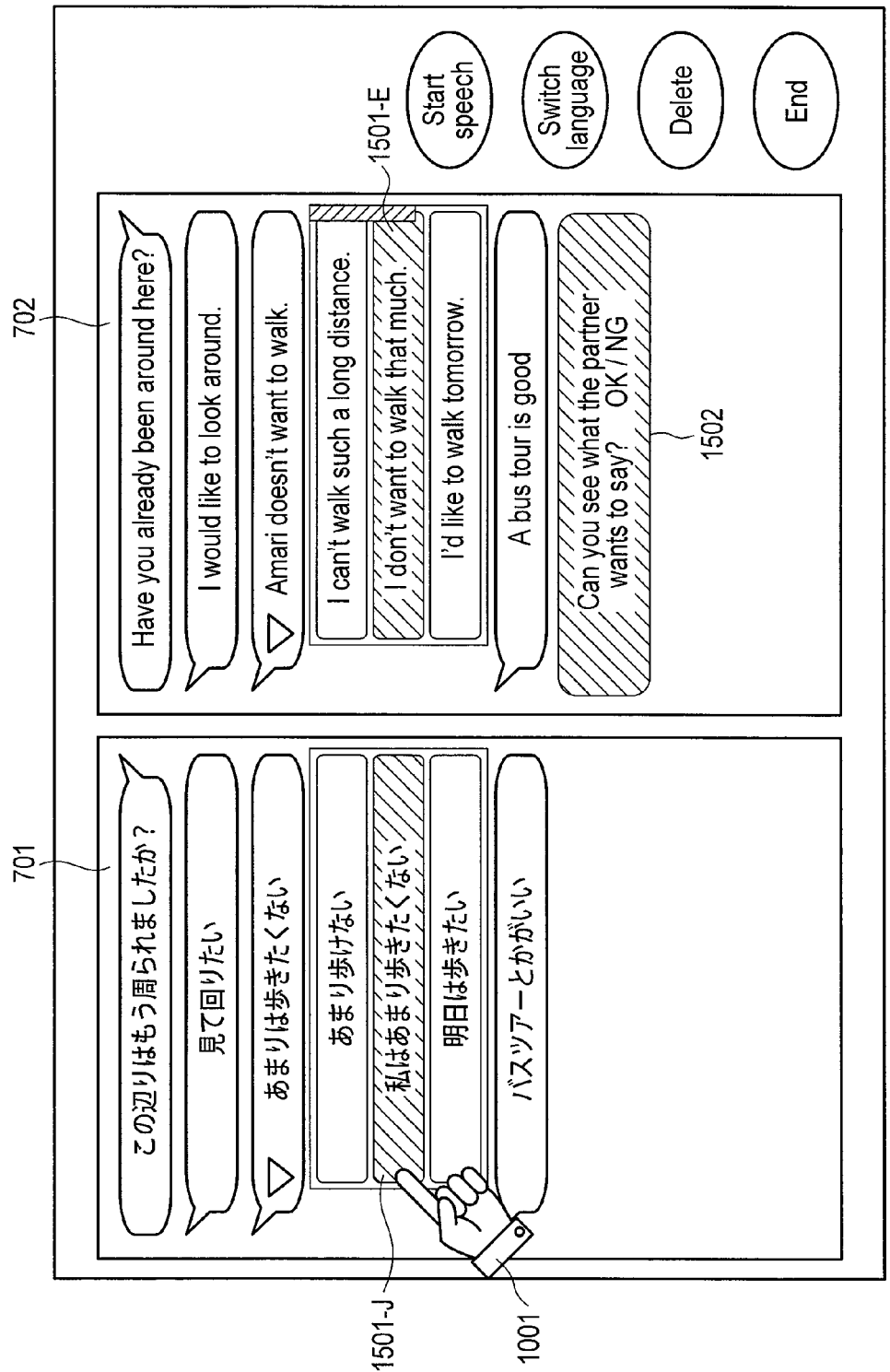
FIG. 15 illustrates the first process of the operation when a user on a source language side selects an example.

As shown in FIG. 15, the source language user selects a similar example. In this example, the similar example 1501-J "私はあまり 歩きたくない (watashi wa amari aruki taku nai)" is selected and highlighted. If the similar example 1501-J is selected, the translation example 1501-E "I don't want to walk" displayed in the display area 702 on the target language side is highlighted. At the same time, a confirmation message 1502 "Can you see what your partner wants to say" is displayed on the display area 702.

Figure 16:
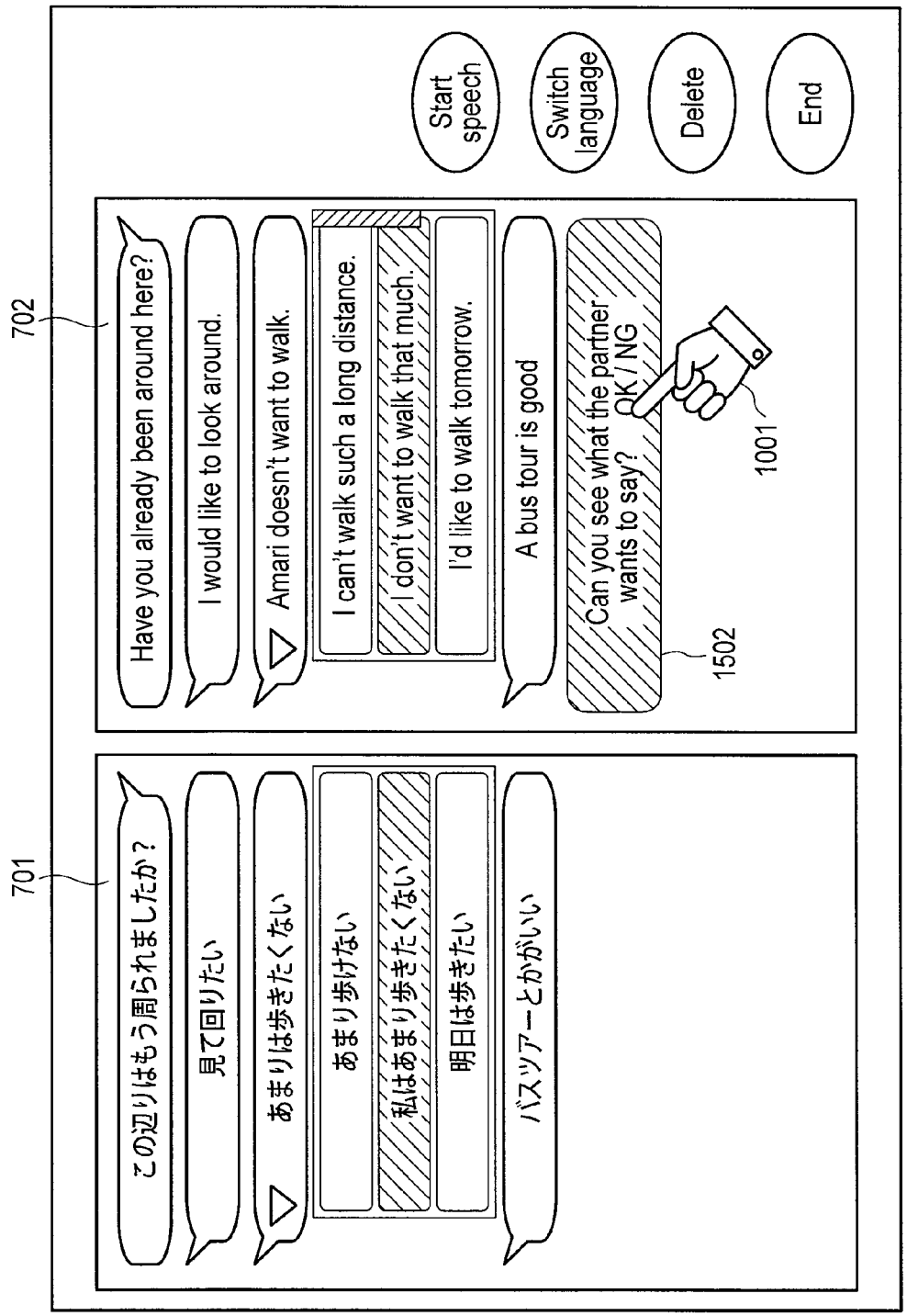
FIG. 16 illustrates the second process of the operation when a user on a source language side selects an example.

In FIG. 16, the target language user points out whether or not the user accepts the highlighted translation example with the cursor 1001, etc. Thus, if there is a sentence having similar examples in a source language word string, the source language user can select a similar example by themselves to paraphrase what they have said.

Figure 17:
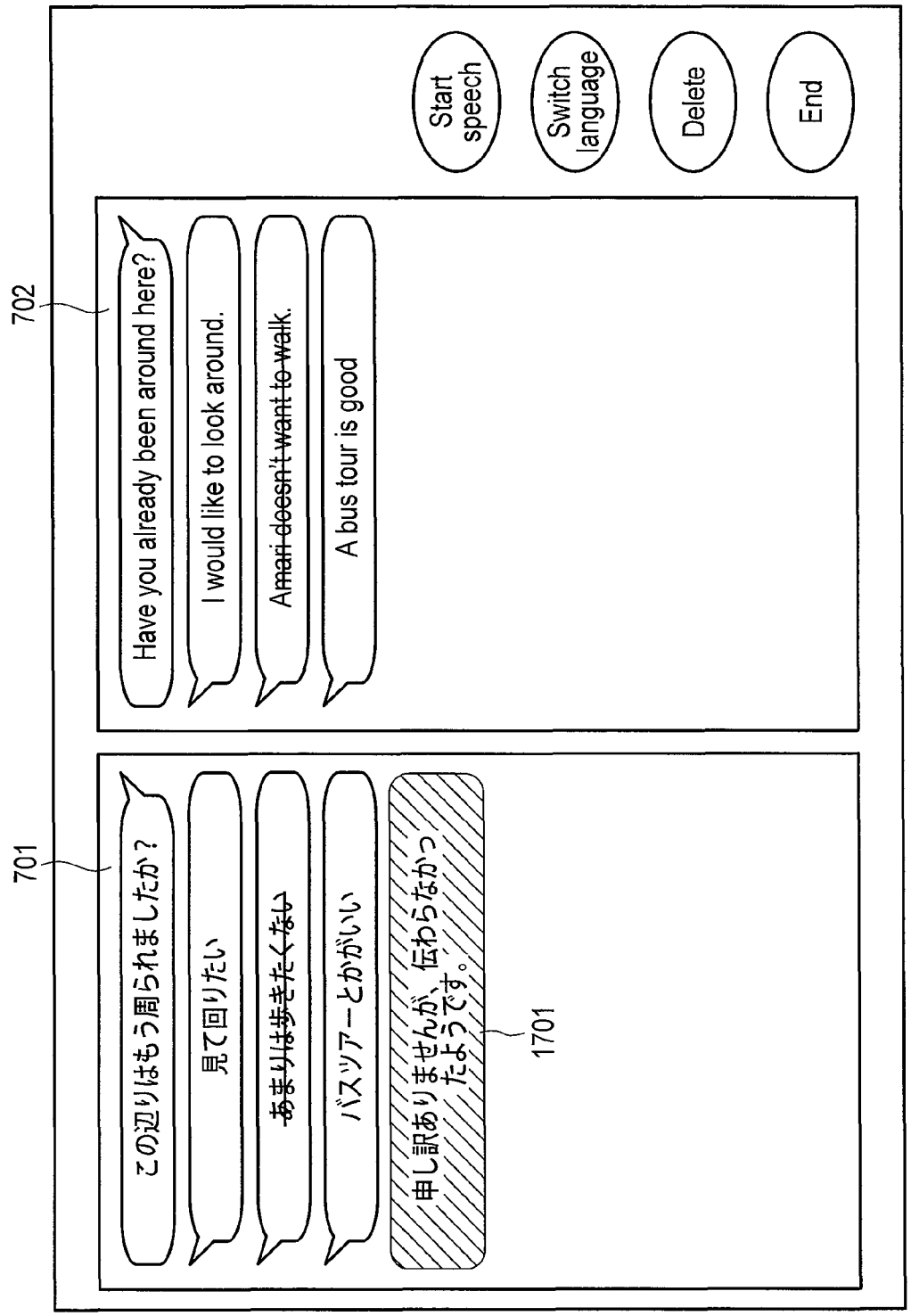
FIG. 17 illustrates an example of screen when no suitable examples are available.

Next, an example where there are no appropriate similar and translation examples is explained with reference to FIG. 17.

When the target language user or the source language user determines that there is no appropriate example and does not select any example, no example is inserted to a source language word string or target language word string to be processed. Further, the source language word string or target language word string to be processed is deleted, and a confirmation message 1701, such as "申し訳あり ませんが、 伝わらなか ったようです。(mousiwake ari masen ga, tutawara nakatta you desu) (Unfortunately, your partner could not understand what you said)," is displayed.

In this case, although the content of the target language word string did not get across to the target language user, at least the source language user can know the machine translation of what they said was not understood by the target language user. Thus, it is possible for the source language user to rephrase what he wants to say.

According to the first embodiment as described above, search for similar examples is conducted for a source language word string, and if there is similar example and a user selects the similar example, the similar example and corresponding translation example are displayed. Thus, the users can cooperate to select examples for incomprehensible parts in a source language word string in a speech recognition result and a target language word string in a machine translation result, so that they can understand the incomprehensible parts and have a smooth conversation between different languages.

Further, it is possible to stop speech recognition when a translation example is selected and to display the examples, thereby achieving responsive conversation between users.
(Second Embodiment)

The second embodiment is different from the first embodiment in terms of how the source language examples or the target language examples are stored in the example storage 105. In the second embodiment, a source language example or target language example are associated with annotations when being stored. When translating from a source language to a target language, sometimes the meaning in the source language is unclear. For example, it can be unclear whether "結構です (kekkou desu)" in Japanese means to decline something or accept it. Similarly, it can be unclear whether "you are welcome" in English means a greeting or a response to thanks.

Thus, the second embodiment provides a way to show users an example to which the intention of a source language user and the intention of a target language user are correctly reflected by annotating a source language word string or a target language word string.

The speech translation apparatus according to the second embodiment is the same as the speech translation apparatus 100 according to the first embodiment, except for examples stored in the example storage 105 and the operation at the example search unit 106.

The example storage 105 associates a source language example with an annotation, and associates a target language example with an annotation to store the examples.

The example search unit 106 searches if there is any annotation for a similar example, when any similar example is available for the target language word string.

Next, an example of a table stored in the example storage 105 according to the second embodiment is explained with reference to FIG. 18.

As shown in FIG. 18, a source language example 1801 is associated with an annotation 1802 and stored, and a target language example 1803 is associated with an annotation 1804 and stored. For example, a source language example 1805-J "結構です (kekkou desu)" is associated with an annotation 1805-1 "大丈夫です (daijobu desu)," and a source language example 1806-J "結構です (kekkou desu)" is associated with an annotation 1806-1 "不要で (huyou desu)," and they are stored. Thus, a source language example having multiple meanings is associated with annotations corresponding to each of the meanings.

Herein, for a target language example which is a translation of a source language example with an annotation, a target language translation of a source language example based on the annotation, not a mere translation of a source language example, is stored. For example, a target language example 1805-E "that's good" is stored as a translation of the source language example 1805-J ("結構です (kekkou desu)") in accordance with the annotation 1805-1 ("大丈夫です (daijobu desu)"). For another example, a target language example 1806-E "no, thank you" is stored as a translation of the source language example 1806-J ("結構です (kekkou desu)") in accordance with the annotation 1806-1 ("不要です (fuyou desu)").

If an annotation is available for a target language example, the target language example 1807-E "You're welcome" is associated with the annotation 1807-1 "Welcome to you," and the target language example 1808-E "You're welcome" is associated with the annotation 1808-1 "Don't mention it." Herein, a source language corresponding to a target language example having these annotations, similarly to the case of a source language example having annotations, a source language corresponding to annotations is stored. For example, a translation of the annotation 1807-1 "welcome to you" in the source language, i.e., a source language example 1807-J "いらっしゃいませ (irrashai mase)," is associated with the target language example 1807-E "You're welcome" and the annotation 1807-1 "welcome to you," and is stored.

Similarly, a translation of the annotation 1808-1 "Welcome to you" in the source language, i.e., a source language example 1808-E "とんでもありません (tondemo ari masen)," is associate with the target language example 1808-E "You're welcome" and the annotation 1807-1 "Welcome to you," and is stored. Thus, if different annotations are available for the same source language example, a translation in accordance with each annotation is stored as a target language example. Conversely, if different annotations are available for the same target language example, a translation in accordance with each annotation is stored as a source language example.

Next, a specific example of the operation of the speech translation apparatus according to the second embodiment is explained with reference to FIG. 19.

Figure 19:
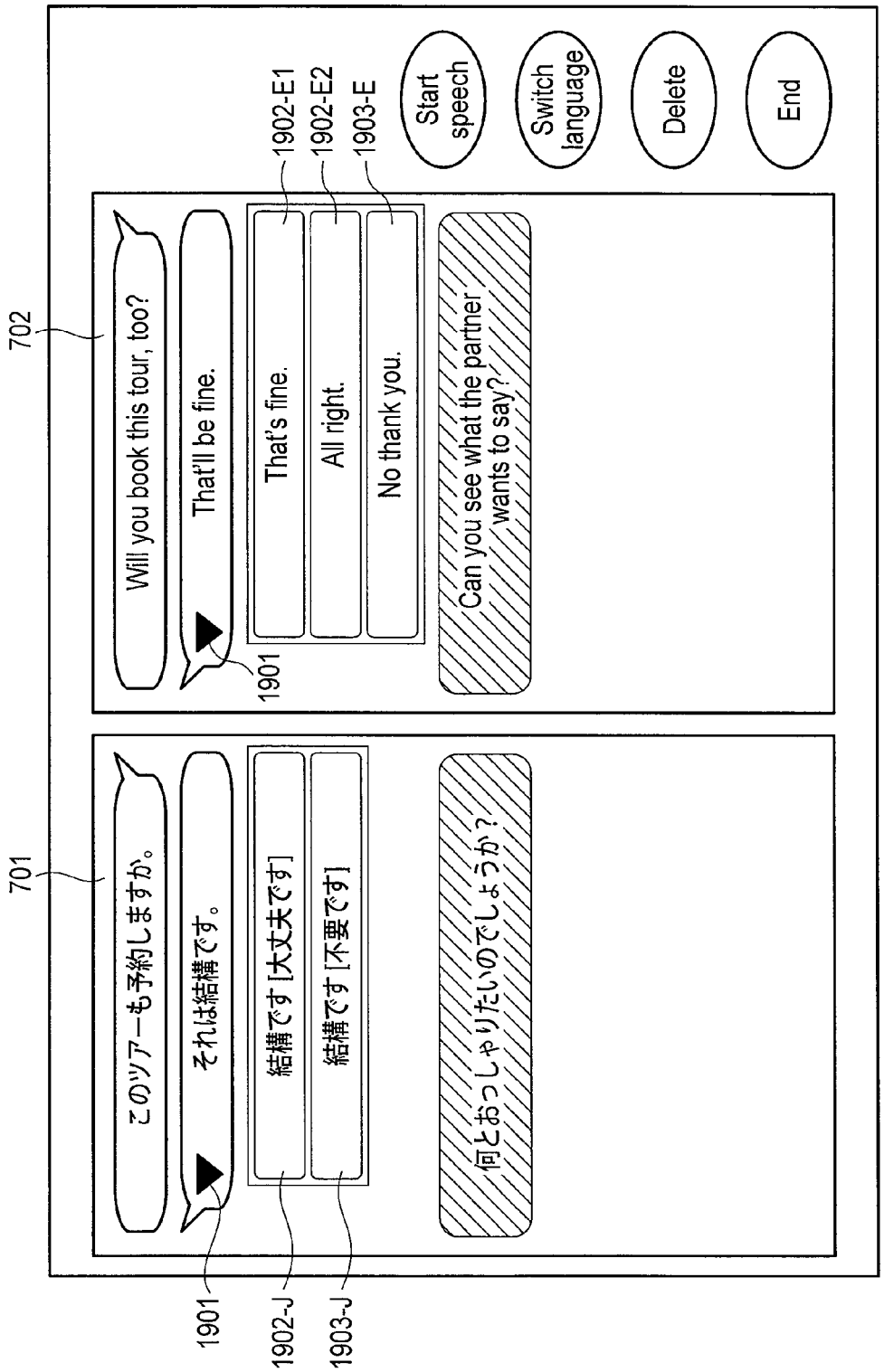
FIG. 19 illustrates an example of the operation of the speech translation apparatus according to the second embodiment.

FIG. 19 is similar to the example shown in FIG. 11; however, in the example of FIG. 19, annotations are shown in addition to the similar examples when displaying a list of examples. For example, "結構です (kekkou desu)" ("daijobu desu") and "結構です (kekkou desu)" ("fuyou desu") are shown in a list of similar examples. It is preferable that an icon 1901 when an annotation is available for a similar example is distinguishable from an icon to indicate no annotations are available for a similar example. For example, if no annotations available, the icon may be in white on a dark background, and if annotations available, the icon may be in black, so that a user can know that the meaning of a sentence is unclear but an annotation for the sentence is available.

In the example shown in FIG. 19, two similar examples, 1902-J "結構です (kekkou desu)" ("結構です (daijobu desu)") and 1903-J "大丈夫です (kekkou desu)" ("不要です (fuyou desu)") are displayed; in other words, corresponding three translations 1902-E1 "That's fine" and 1902-E2 "All right," and 1903-E "No, thank you" are displayed. If a similar example and an annotation are the same, it is displayed when a user selects a similar example corresponding to a translation example.

According to the second embodiment described above, if an annotation is associated with an example, both examples and annotations are displayed, so that both a target language user and a source language user can see the annotations and select appropriate examples for a vague example.
(Third Embodiment)

It is assumed that the above-described first and second embodiments are implemented in a single device. However, the process may be divided to be performed by multiple devices. In the third embodiment, it is assumed that the process is realized by a cooperation of a server and a client.

Generally, when speech translation is performed by a device with limited calculation resource and storage resource on a client, such as a mobile phone and a tablet computer, etc., data amount and search space are limited. Accordingly, by performing speech recognition, machine translation and example search, which impose a heavy processing load, on a server for which calculation resources and storage resources can be easily extended, the amount of processing on a client side can be reduced.

Figure 20A:
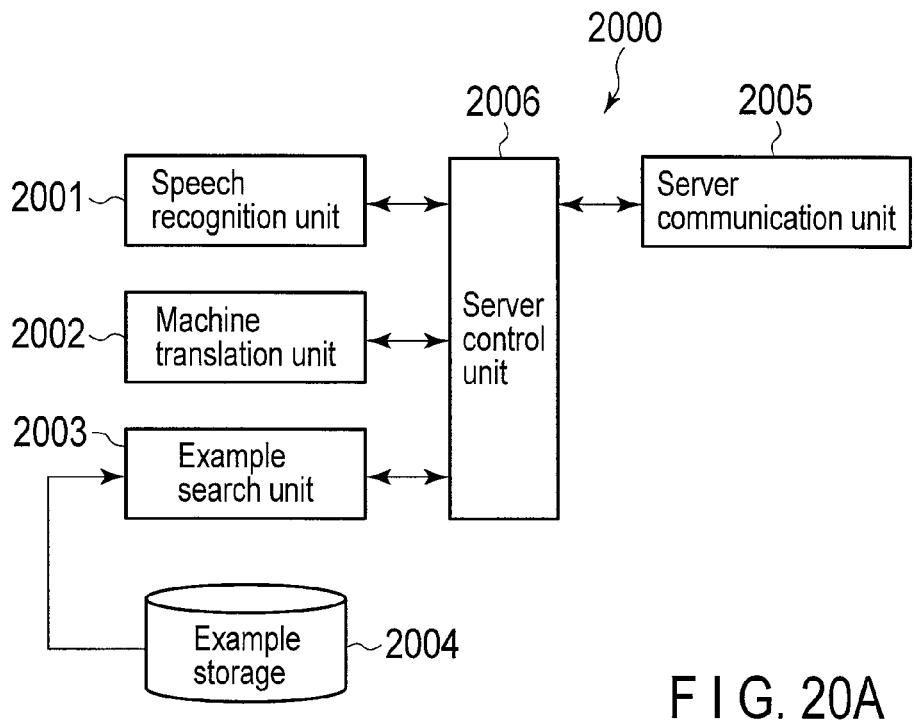
FIGS. 20A and 20B are diagrams of a speech recognition system including the speech translation apparatus according to the third embodiment.
Figure 20B:
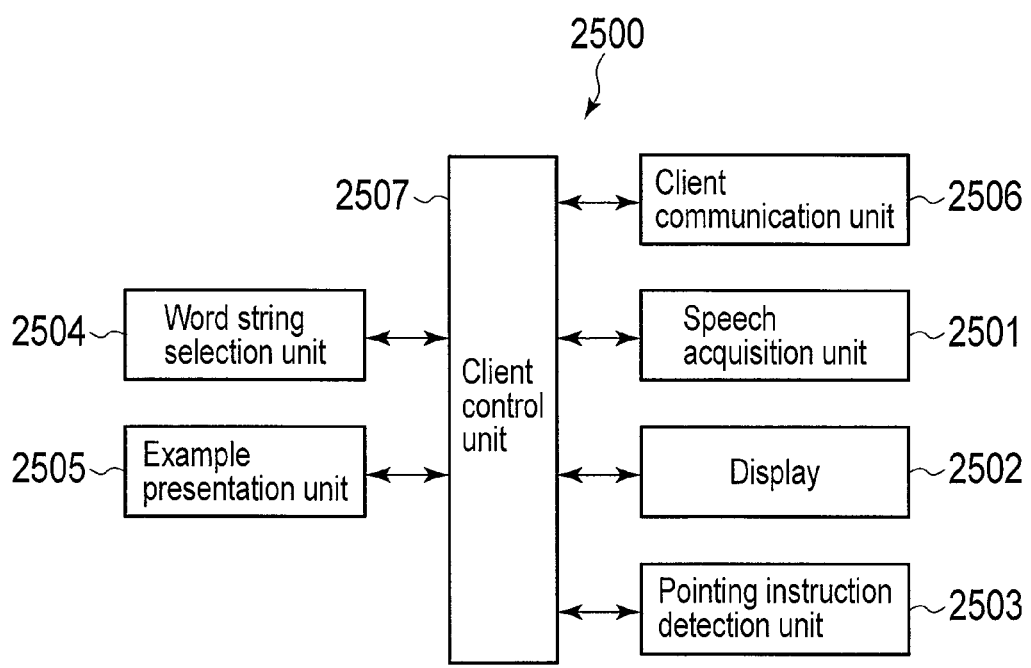

Herein, referring to the block diagram shown in FIG. 20, the speech recognition system including a speech translation apparatus according to the third embodiment is explained.

The speech recognition system shown in FIG. 20 includes a server 2000 and a client 2500.

The server 2000 includes a speech recognition unit 2001, a machine translation unit 2002, an example search unit 2003, an example storage 2004, a server communication unit 2005, and a server control unit 2006.

The explanation of the speech recognition unit 2001, the machine translation unit 2002, the example search unit 2003 and the example storage 2004 are omitted, as the operation of those units are similar to the operation of the speech recognition unit 102, the machine translation unit 103, the example search unit 106 and the example storage 105 according to the first embodiment.

The server communication unit 2005 communicates data with a client communication unit 2506 which will be described later.

The server control unit 2006 controls the entire operation at the server.

The client 2500 includes a speech acquisition unit 2501, a display 2502, a pointing instruction detection unit 2503, a word string selection unit 2504, an example presentation unit 2505, a client communication unit 2506 and a client control unit 2507.

The explanation of the speech acquisition unit 2501, the display 2502, the pointing instruction detection unit 2503, the word string selection unit 2504 and the example presentation unit 2505 is omitted as the operation of those units is the same, as the operation of the speech acquisition unit 101, the display 104, the pointing instruction detection unit 107, the word string selection unit 108 and the example presentation unit 109 according to the first embodiment.

The client communication unit 2506 communicates data with the server communication unit 2005.

The client control unit 2507 entirely controls the client 2500.

Next, an example of the speech translation performed by the server 2000 and the client 2500 is explained.

At the client 2500, the speech acquisition unit 2501 acquires speech from a user, and the client communication unit 2506 transmits speech signals to the server 2000.

At the server 2000, the server communication unit 2005 receives speech signals from the client 2500, and the speech recognition unit 2001 performs speech recognition on the received speech signals. Then, the machine translation unit 103 performs machine translation on the speech recognition result. The server communication 2005 transmits the speech recognition result and the machine translation result to the client 2500. Further, the example search unit 2003 searches similar examples similar to the speech recognition result, and if a similar example is available, the similar example and a corresponding translation example are transmitted to the client 2500.

At the client 2500, the client communication unit 2506 receives the speech recognition result and the machine translation result, and the similar example and the translation example corresponding to those results, and the display 2502 displays the speech recognition result and the machine translation result. If the pointing instruction detection unit 2503 detects an instruction from a user, the example presentation unit 2505 presents a translation example and a similar example related to the selected word string.

There is a case where the client 2500 receives a predetermined number of extracted similar examples and corresponding translation examples, not all of the similar examples, if any similar examples are available for a speech recognition result. In this case, the client 2500 transmits a request to the server 2000 to receive other similar examples that have not yet received or translation examples corresponding to the similar examples. The example search unit 2003 of the server 2000 extracts a similar example that has not yet been extracted and a corresponding translation example, and the server communication unit 2005 transmits the similar example and the translation example. At the client 2500, the client communication unit 2506 receives the similar example and the translation example, and displays a new similar example and a translation example.

It is also possible that the server 2000 transmits only a flag indicating that a similar example is available to the client 2500. At the client 2500, when a pointing from a user is detected, a request for a similar example and a translation example related to the selected word string is sent to the server 2000, and the server 2000 transmits a similar example and a translation example in accordance with a request to the client 2500. Thanks to this configuration, search for examples is performed only when needed, and thus, the speed of speech translation can be improved on the client side.

According to the third embodiment described above, the speech recognition, machine translation and example search, which impose a heavy processing load, are performed on a server for which calculation resources and storage resources can be easily extended; as a result, the processing load on the client can be reduced.

The flowcharts of the embodiments illustrate methods and systems according to the embodiments. It will be understood that each block of the flowchart illustrations, and combinations of blocks in the flowchart illustrations, can be implemented by computer program instructions. These computer program instructions may be loaded into a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded into a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech translation apparatus comprising:
   an acquisition unit configured to acquire speech in a first language as a speech signal;
   a speech recognition unit configured to successively perform speech recognition on the speech signal to obtain a first language word string which is a result of the speech recognition;

a translation unit configured to translate the first language word string into a second language to obtain a second language word string which is a result of translation;

a search unit configured to search for at least one similar example for each first language word string, and, if there is the similar example, to acquire the similar example and a translation example which is a result of the translation of the similar example in the second language, the similar example indicating a word string that is similar to the first language word string in the first language;

a selection unit configured to select, in accordance with a user instruction, at least one of the first language word string associated with the similar example and the second language word string associated with the translation example, as a selected word string; and a presentation unit configured to present one or more similar examples and one or more translation examples associated with the selected word string.

2. The apparatus according to claim 1, further comprising a display configured to display each of the first language word string and the similar example, and the second language word string and the translation example, wherein the presentation unit causes the display to display a first icon indicating that there is an example associated with the first language word string and corresponding second language word string, if the first language word string has a similar example.

3. The apparatus according to claim 1, wherein the presentation unit presents a list of a plurality of the similar examples and the translation examples if the selected word string is selected.

4. The apparatus according to claim 1, wherein the presentation unit highlights both the similar examples and the translation examples if the similar example or the translation example is selected, and further presents a first notification to prompt a user to determine whether or not the highlighted similar example or the highlighted translation example is appropriate.

5. The apparatus according to claim 1, further comprising a storage configured to store the similar example and the translation example in association with each other.

6. The apparatus according to claim 5, wherein the storage stores the similar example, the translation example, and an annotation for at least one of the similar example and the translation example in association with each other.

7. The apparatus according to claim 6, wherein if the first language word string has a first similar example and there is the annotation associated with the first similar example, the presentation unit causes the display to display a second icon in association with the first language word string and the corresponding second language word string to indicate that the annotation is available.

8. The apparatus according to claim 2, wherein the presentation unit causes the display to display a second notification to prompt a user to confirm the first language word string if the second language word string is selected.

9. A speech translation apparatus comprising:

an acquisition unit configured to acquire speech in a first language as a speech signal;

a display configured to display a first language word string which is a result of speech recognition successively performed for the speech signals, and a second language word string which is a translation of the first language word string;

a detection unit configured to detect a location on the display indicated by a user;

a selection unit configured to select, in accordance with the location, at least one of the first language word string and the second language word string; and a presentation unit configured to present one or more similar examples which are examples in the first language and similar to the first language word string and one or more translation examples which are translations of the similar examples in the second language, wherein the display further displays the presented similar examples and translation examples.

10. A speech translation method comprising:

acquiring speech in a first language as a speech signal;

performing speech recognition on the speech signal to obtain a first language word string which is a result of the speech recognition successively;

translating the first language word string into a second language to obtain a second language word string which is a result of translation;

searching for at least one similar example for each first language word string, and, if there is the similar example, acquiring the similar example and a translation example which is a result of the translation of the similar example in the second language, the similar example indicating a word string that is similar to the first language word string in the first language;

selecting, in accordance with a user instruction, at least one of the first language word string associated with the similar example and the second language word string associated with the translation example, as a selected word string; and presenting one or more similar examples and one or more translation examples associated with the selected word string.

11. The method according to claim 10, further comprising displaying, at a display, each of the first language word string and the similar example, and the second language word string and the translation example, wherein the presenting the one or more similar examples causes the display to display a first icon indicating that there is an example associated with the first language word string and corresponding second language word string, if the first language word string has a similar example.

12. The method according to claim 10, wherein the presenting the one or more similar examples presents a list of a plurality of the similar examples and the translation examples if the selected word string is selected.

13. The method according to claim 10, wherein the presenting the one or more similar examples highlights both the similar examples and the translation examples if the similar example or the translation example is selected, and further presents a first notification to prompt a user to determine whether or not the highlighted similar example or the highlighted translation example is appropriate.

14. The method according to claim 10, further comprising storing, in a storage, the similar example and the translation example in association with each other.

15. The method according to claim 14, wherein the storing in the storage stores the similar example, the translation example, and an annotation for at least one of the similar example and the translation example in association with each other.

16. The method according to claim 15, wherein if the first language word string has a first similar example and there is the annotation associated with the first similar example, the presenting the one or more similar examples causes the display to display a second icon in association with the first language word string and the corresponding second language word string to indicate that the annotation is available.

17. The method according to claim 11, wherein the presenting the one or more similar examples causes the display to display a second notification to prompt a user to confirm the first language word string if the second language word string is selected.

18. A non-transitory computer readable medium including computer executable instructions, wherein the instructions, when executed by a processor, cause the processor to perform a method comprising:

acquiring speech in a first language as a speech signal;

performing speech recognition on the speech signal to obtain a first language word string which is a result of the speech recognition successively;

translating the first language word string into a second language to obtain a second language word string which is a result of translation;

searching for at least one similar example for each first language word string, and, if there is the similar example, acquiring the similar example and a translation example which is a result of the translation of the similar example in the second language, the similar example indicating a word string that is similar to the first language word string in the first language;

selecting, in accordance with a user instruction, at least one of the first language word string associated with the similar example and the second language word string associated with the translation example, as a selected word string; and presenting one or more similar examples and one or more translation examples associated with the selected word string.

19. The medium according to claim 18, further comprising displaying, at a display, each of the first language word string and the similar example, and the second language word string and the translation example, wherein the presenting the one or more similar examples causes the display to display a first icon indicating that there is an example associated with the first language word string and corresponding second language word string, if the first language word string has a similar example.

20. The medium according to claim 18, wherein the presenting the one or more similar examples presents a list of a plurality of the similar examples and the translation examples if the selected word string is selected.

* * * * *